United States Patent [19]
Moore

[11] 4,347,666
[45] Sep. 7, 1982

[54] APPARATUS FOR CUTTING VEGETATION
[75] Inventor: Robert J. Moore, Fontana, Calif.
[73] Assignee: Emerson Electric Co., St. Louis, Mich.
[21] Appl. No.: 173,192
[22] Filed: Jul. 25, 1980
[51] Int. Cl.³ .............................................. A01D 50/00
[52] U.S. Cl. ...................................... 30/276; 56/12.7; 56/295
[58] Field of Search ................... 30/276, 347; 56/12.7, 56/295

[56] References Cited
U.S. PATENT DOCUMENTS 4,104,796  8/1978  Sheldon ................................. 30/276
4,236,312  12/1980 Foster et al. .......................... 30/276
4,254,550  3/1981  Satoh ..................................... 30/276
4,285,127  8/1981  Zerrer et al. .......................... 30/276

FOREIGN PATENT DOCUMENTS 2828425  1/1980  Fed. Rep. of Germany ........ 30/276

Primary Examiner—Jimmy C. Peters
Attorney, Agent, or Firm—Hubbard, Thurman, Turner, Tucker & Glaser

[57] ABSTRACT

An apparatus for cutting vegetation with a rotating head carrying a flexible, non-metallic cutting line extended radially into a cutting plane. An additional length of line is extended into the cutting plane automatically during rotation of the head as its speed increases from a first magnitude to a second magnitude. A laterally displaced cam within the head moves outwardly for releasing a spool carrying coiled cutting line to advance a first angular displacement within the head. The spool rotates a second angular displacement to return the cam to its original position by the drag of the cutting line during vegetation cutting but not by free air travel. After the cutting line length extension is completed, the spool is secured by the cam at its initial position automatically against further rotation within the head.

26 Claims, 8 Drawing Figures

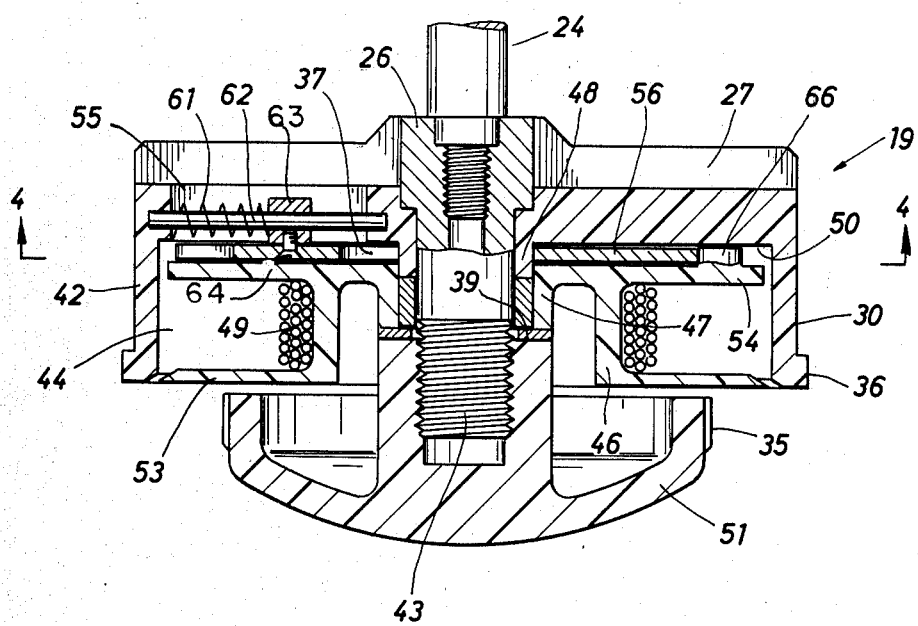
FIG. 3
FIG. 4
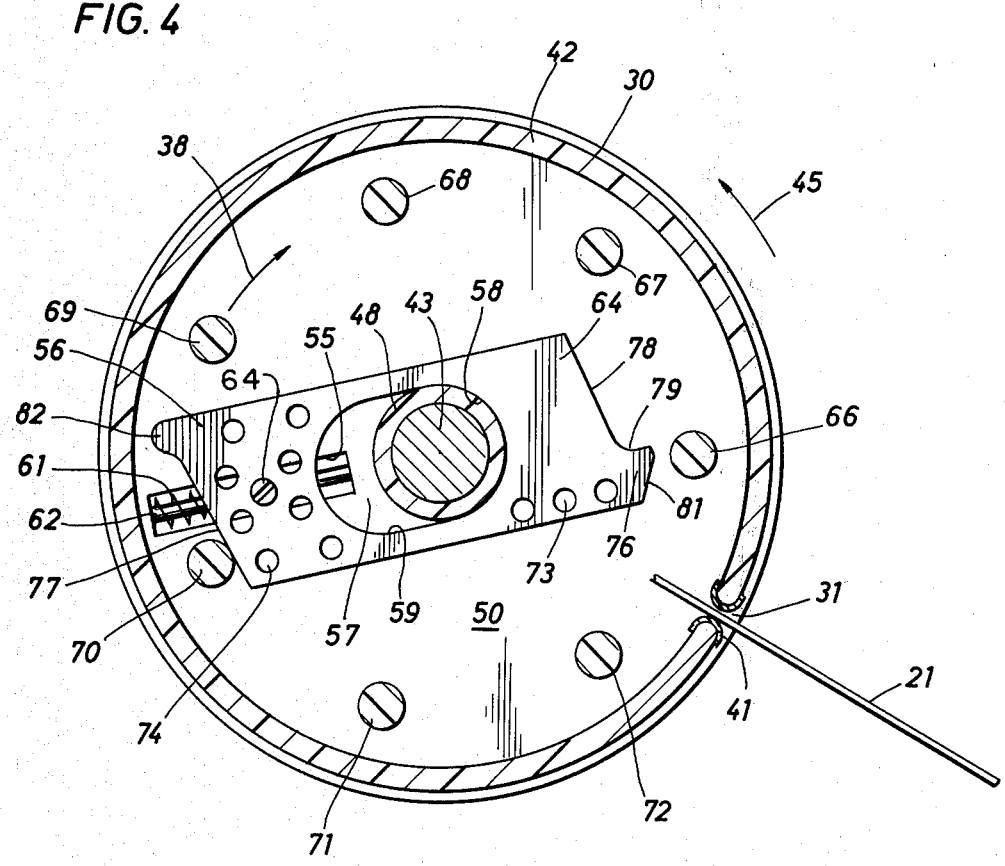

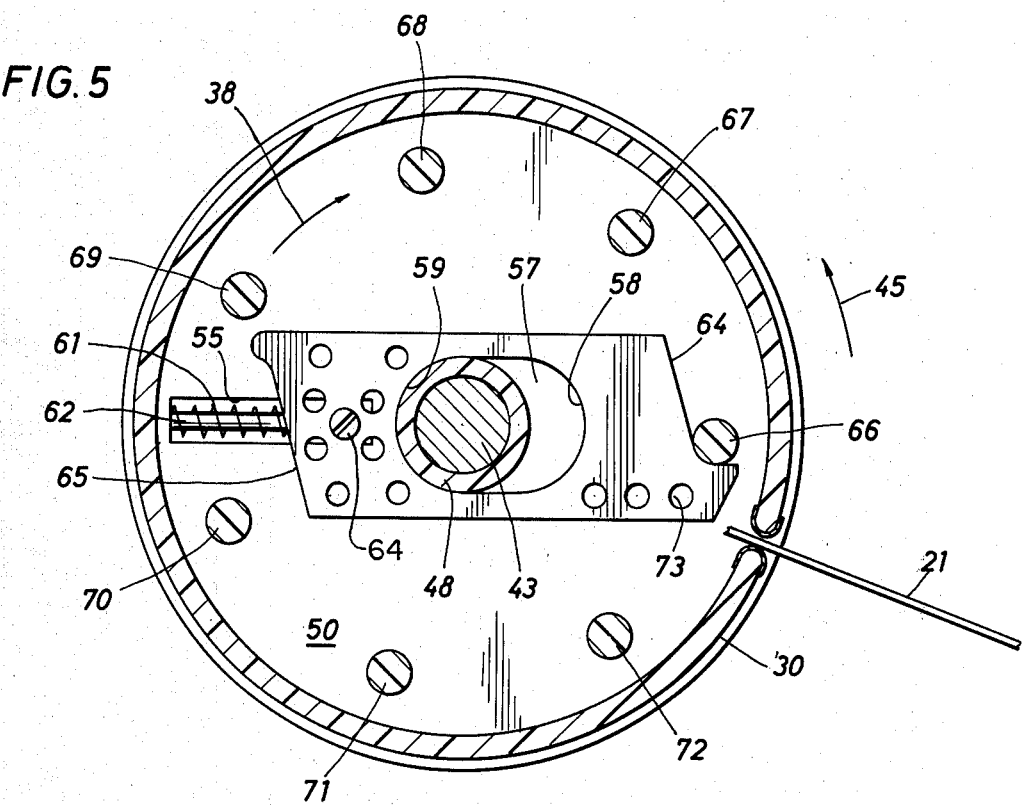

APPARATUS FOR CUTTING VEGETATION

BACKGROUND OF THE INVENTION

1. Field of the Invention

This invention relates to the cutting of vegetation, and more particularly, it relates to the cutting of vegetation using a flexible, non-metallic cutting line extending from a rotating head into a cutting plane.

2. Description of Prior Art

Various types of devices have been proposed for many years to facilitate the removal of vegetation by mowing, trimming, edging and like cutting operations. In general, these devices have employed a metal blade to effect vegetation removal. Devices of this nature employ prime movers such as electric and gasoline motors. As a result, rotating metal blades can inflict serious and terrible injury upon the user.

In the United States of America, practical vegetation cutting devices using flexible, non-metallic lines carried upon a rotating head were developed. Examples of these devices are shown in U.S. Pat. Nos. 3,708,967, 3,826,068, 4,052,789, 4,054,992, 4,067,108 and 4,104,797. These patented devices have met outstanding success in that these American developments provide safer electrical or gasoline-powered tools for vegetation cutting, edging and trimming operations.

The devices shown in these patents employ a flexible cutting line, such as manufactured from Nylon ® polymer. The cutting line is carried usually upon a spool internally of a rotating head. When desired to replenish the line or to extend an additional length of it, the rotation of the head was stopped and line manually extended from the spool. This line extension procedure in the patented devices has been found to be convenient, simple and reliable. In many of the more powerful devices, especially those powered by DC electric motors, a system to extend the cutting line from the head without interrupting cutting operations was desired.

A most desirable system would be capable of feeding automatically cutting line as needed from the spool and without the action of the operator. Structures directed toward this purpose are shown in U.S. Pat. Nos. 3,895,440, 4,020,550 and 4,035,915. These structures have in common a basket-weave supply of cutting line carried on the periphery of a disc with the line feeding from behind special post members. These post members have a cutting-abrading edge so that cutting line from the weave supply is bent about such edge in the free traveling end portion extending into the cutting plane. The combination function of the edge, line, angular speed, etc., is arranged so that the line posts with such edge sever the free end of the cutting line when it is worn to an ineffective length. In practice, these structures are found to waste about 25 percent of the cutting line because of the excessive length of line severed at the post's edge, e.g., three inches.

Other line feeding structures are shown in U.S. Pat. Nos. 4,118,864 and 4,138,810. These mechanisms control spool rotation in line feeding functions by worm and spur gears having complex action in the vegetation cutting environment. Another line feeding mechanism is shown in U.S. Pat. No. 4,104,796 wherein speed sensitive cams control rotation of a spool within a cutting head.

The present invention provides a rotating head with a simple mechanism that maintains the cutting line at its maximum present length in the cutting plane irrespective of rates of cutting line wear or loss and without interrupting vegetation cutting or requiring independent operation action. However, the operator can selectively activate the mechanism if additional lengths of cutting line extensions are desired.

SUMMARY OF THE INVENTION

In accordance with this invention, there is provided an apparatus for cutting vegetation which has a head rotatable about an axis of rotation. The head carries a spool journaled for rotation and the spool carries a coiled supply of a flexible non-metallic cutting line. The cutting line is uncoiled from the spool and has a free end extending through an aperture outwardly of the head and into the cutting plane. The head carries means including an elongated planar cam for selectively controlling rotation of the spool within the head so that increments of the cutting line are extended into the cutting plane during head rotation. The cam is mounted within the head transverse to the rotational axis and adapted to move from an initial position to an outward position by centrifugal force when the head increases in rotational speed from a first magnitude to a second magnitude. A biasing means returns the cam into the initial position at rotational speeds less than the first magnitude. The cam is provided with locking means for securing the spool against rotation relative to the head when the cam is in the initial position. The cam is provided also with cam surface means acted upon by rotation of the spool within the head for returning the cam from its outward position to the initial position and thereby securing the spool against rotation. The return of the cam is produced by the drag of the cutting line during vegetation cutting and not in free air travel.

DESCRIPTION OF THE DRAWINGS

FIG. 3 is a vertical section, in enlargement, taken through the head of the apparatus shown in FIG. 2;

FIG. 4 is a horizontal cross-section of the head shown in FIG. 3 taken along line 4—4, illustrating the cam in its outward position after partial extention of the cutting line;

FIG. 5 is the section of FIG. 3, but with the cam moved to its initial position with completed extension of the cutting line from the head; and FIGS. 6, 7 and 8 are partial plan views of several cam embodiments that can be employed within the head shown in FIG. 5.

DESCRIPTION OF SPECIFIC EMBODIMENTS

Figures 1, 2:
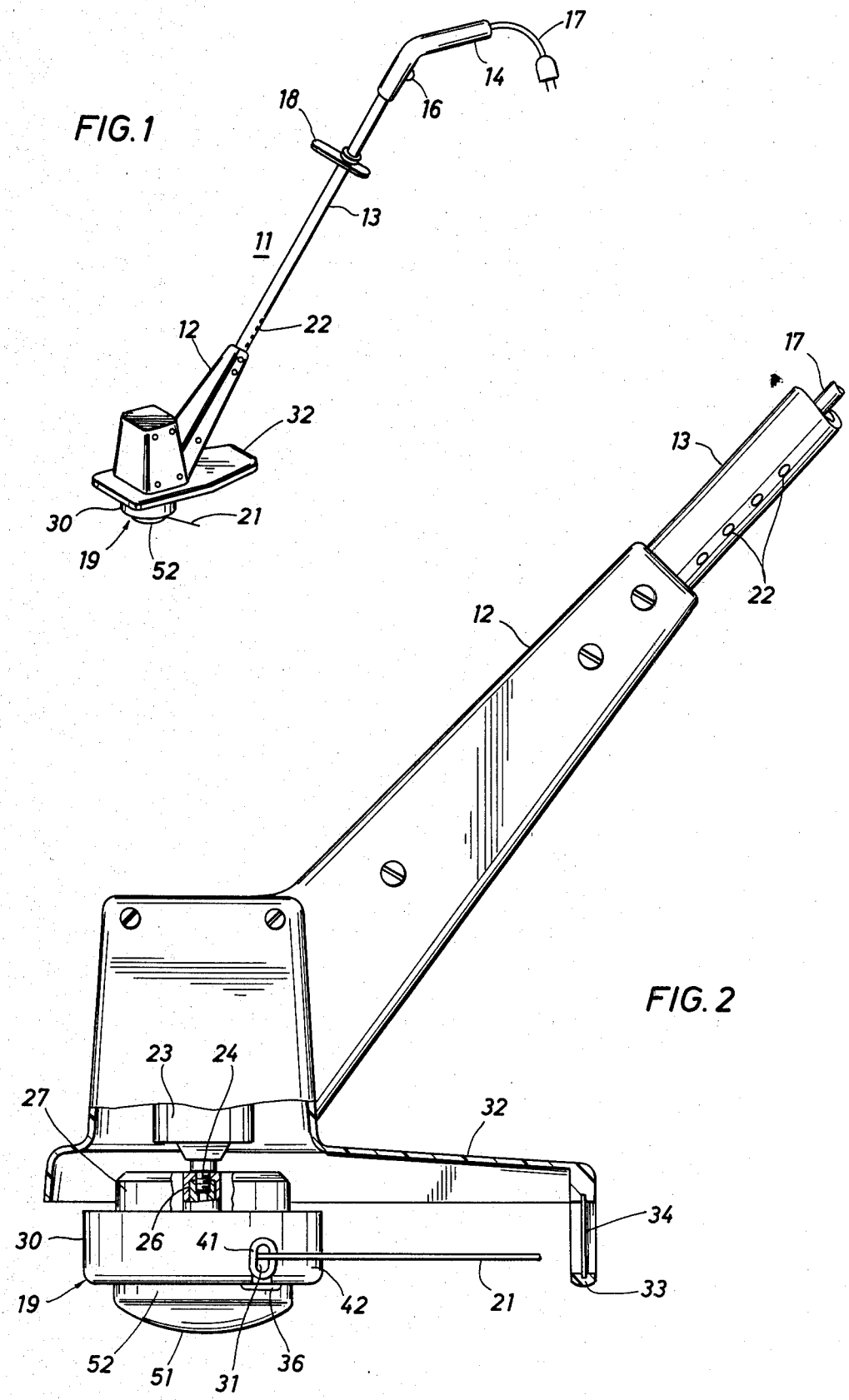
FIG. 1 is a pictorial view illustrating one embodiment of the apparatus for cutting vegetation arranged according to the present invention.
FIG. 2 illustrates an enlargement the lower portion of the apparatus shown in FIG. 1.

Referring to FIG. 1, there is shown an apparatus for cutting vegetation, which is constructed in accordance with one embodiment of the present invention. In this particular embodiment, the apparatus is a grass trimmer 11, but it could be a lawnmower, edger or other device for vegetation-cutting purposes. The trimmer 11 has a lower housing 12 interconnected by a tube 13 to a handle assembly 14. The assembly 14 provides a switch 16 for selectively applying electrical power received by a cord 17 to an electrical motor carried within the housing 12. For two-handed operation of the trimmer 11, an auxiliary handle 18 is provided upon the tube 13. The lower housing 12 carries a rotatable head 19 from which extends at least one length of a flexible, non-metallic filament or cutting line 21. The trimmer can be generally of any suitable construction such as described in U.S. Pat. No. 4,052,789. Rotation of the head 19 about an axis passing through the housing 12 extends the cutting line 21 at a vegetation-cutting attitude into a cutting plane which is substantially perpendicular to the axis of rotation of the head.

In FIG. 2, there is shown an enlargement of the housing 12 with a portion of the tubing 13 carrying a plurality of air induction openings 22. These openings introduce a flow of cooling air over the prime mover contained in the housing 12. In the particular embodiment being described, the housing 12 includes an electric motor 23 which has a downwardly-extending drive shaft 24. The motor has a conventional relationship of speed inversely proportional to the load. The head 19 is threadedly connected to the shaft 24 by a metal adapter 26. The adapter 26 extends from the upper face of the head 19 and it is surrounded by a plurality of vanes 27 serving as a centrifugal blower for moving air radially outward from the head 19 during its rotation. As a result, the induced flow of air through the openings 22 cools the motor 23 within the housing 12. The head 19 includes a hub 42 and a lower cover or glide ball 51. The ball 51 is secured to the hub 42 in any convenient fashion. The hub 42 carries in its side peripheral surface 30 an aperture 31 through which the cutting line 21 extends radially outward into the cutting plane. A guide member 36 may be placed across the open end of the aperture 31 to limit axial movement of the cutting line 21.

The housing 12 includes a rearwardly-extending tail part 32 which serves as a protection to the user to prevent inadvertent contact with the rotating cutting line 21. Also, the tail part provides an automatic limit to the extension of the cutting line 21 from the head 19. More particularly, the tail part 32 has downwardly-extending projection 33 in which is embedded a metal cutting blade 34. As a result, the cutting line 21 rotated by the head 19 can never have an operating length greater than the distance from the axis of rotation to the cutting blade 34, since any greater length automatically will be severed.

The head 19, as seen in FIGS. 3-5, is disc-like with a smooth peripheral side surface 30 which has the aperture 31. Also a metal cuvilinear bearing 41 covers the edges of the aperture 31. The bearing 41 may also provide the guide member 36 by encircling the aperture 31. The hub carries in non-rotating connection the adapter 26 in which the drive shaft 24 is threaded. In addition, the adapter 26 extends axially through the head 19 to form a convenient stud 43 to thread into the ball 51 for securing the various head elements together. The interior of the hub 42 is formed into a cylindrical opening 44 in which is disposed a spool 46. The spool is mounted for independent rotation relative to the head 19. For the purpose, a cylindrical interior wall 47 of the spool is journaled on a post 48 about the stud 43. Preferably, the post 48 is integral with the hub 42 and abuts upon an end 39 formed on the ball 51. The wall 47 is held in the opening 44 by the end 39. As a result, the spool is mounted to rotate in the hub 42 but it is held against axial movement. A supply of the cutting line 21 is coiled upon the spool 46 in several layers 49. The interior end of the coiled cutting line 21 is secured to the spool 46. The other end of the cutting line 21 extends outwardly through the aperture 31 from the hub into the cutting plane.

The exposed surface 52 of the head 19 is of convex configuration and is smooth in contour, without substantial projections and recesses capable of trapping appreciable vegetation. Preferably, the surface 52 is coaxially aligned with the axis of rotation of the head 19. Stated in another manner, all parts of the surface 52 are unbroken in the line of travel during rotation of the head 19. However, this surface may be curved or multi-planar on a radial line extending across the head. In this manner, the surface 52 travels freely through the vegetation being cut, without appreciable loading of the electric motor 23.

As is best shown in FIG. 3, the glide ball 51 is spaced axially away from the reel flange 53 on the spool 46. Thus, the spool can rotate freely relative to the ball 51. The reel flange 54 of the spool is separated a small axial dimension by space 37 from the interior end surface 50 of the hub 42. The cam 56 is mounted in this space 37 and provides an end bearing to assist free rotation of the spool 46 in head 19.

The head 19 in cutting vegetation is rotated counter-clockwise as shown by the arrow 45. However, the spool 46 rotates clockwise to free cutting line, relative to the hub 42, as shown by the arrow 38. The cam 56 is a mechanism responsive to centrifugal forces to move from an initial position (FIG. 5) to an outward position (FIG. 4) for controling rotation for a first angular displacement of the spool relative to the hub. The cam 56 is then returned into the initial position (FIG. 5) and the remaining cutting line is fed by the spool rotating a second angular displacement from the head into the cutting plane.

The cam is arranged to move from the initial position to the outward position responsive to the increase in rotational speed of the head when a certain short length of extended cutting line is reached during cutting operations. At a reduced rpm (e.g., 6,000 rpm or less) of the head, such as reflecting a certain long extended cutting line length, the cam is shown in FIG. 5 in its initial position where the spool is locked to the head (non-line-feeding condition). At an increased rpm (e.g., 7,000 rpm or greater) of the head such as reflecting a certain short extended cutting line length, the cam is laterally displaced into its outward position as shown in FIG. 4. Cam displacement from the initial position to the outward position allows the spool to rotate a first angular displacement, for feeding the increment (e.g., one inch) of cutting line from the head. Although the increased extended cutting line reduces the head rpm, the cam 56 will not return to its initial position for locking positively the spool and hub together. The centrifugal forces exerted upon the cam at such reduced head rpm cannot move the cam from the outward position to the inward position. It would take about a four inch cutting line extension to reduce the free air head rpm sufficiently to cause the cam to return into the initial position.

An important advantage resides in this type of cutting line extension since it avoids a repeating of "machine gun feeding" problem where the spool advancement mechanism operates at a certain high and low speed set points. Operation of such a cutting head between vegetation cutting and free air rotation will nearly always cause "machine gun feeding" because of the overlap at the speed setpoints of high and low speed cam movements.

In the present head, the cam is returned from the outward to the inward position to complete spool advancement solely by the drag of the cutting line in cutting vegetation. The cam has a cam surface means acted on by rotation of the spool induced only by the drag of the cutting line and not induced by free air travel of such cutting line. As the cam returns to the initial position, the spool completes its angular displacement to complete the extension by an increment (e.g. one inch) of cutting line from the head. If the cutting line length is below the length where the head rotates at the increased rpm, the line feeding cycle is repeated.

The described variation in the rpm conditions of the rotating head responsive to changes in the extended cutting line length is inherent in all conventional electric and gasoline-powered trimmers. Obviously, it takes more power (torque) to rotate the head 19 with a long extended cutting line, which results in reduced rotational speed when the prime mover is powered by a fixed power magnitude (constant voltage or fixed throttle setting).

More particularly, the cam 56 is arranged to be laterally displaced to its outward position (FIG. 4) by centrifugal forces at the certain increased rpm of the head 19. The cam 56 is biased to return to its initial position (FIG. 5) against lesser centrifugal forces at a much reduced rpm (e.g. 500) of the head. As a result, the rotation of the head can be started and stopped to induce the cutting line extension cycle, at least in part. Movement of the cam 56 between these positions controls rotation of the spool 46 in the hub 42.

Preferably, the cam 56 is unitary, i.e., of rigid one-piece construction so as to avoid multi-part balancing problems which make difficult proper synchronization in rotary operation.

The cam 56 can be an elongated member of thin metal (i.e., aluminum), and it is mounted for lateral displacement in the space 37 present between the flange 54 and surface 50. As seen in FIGS. 3–5, the cam 56 resides in a plane transverse to the rotational axis of the head 19. The post 48 serves as a guide for an elongated opening 57 within the cam 56. The opening 57 has rounded ends 58 and 59 which abut the post 48 when the cam 56 is at its initial and outwardly positions, respectively.

The cam 56 is shown at the initial position (FIG. 5) with the head carrying a proper long length of extended cutting line. A spring 61 mounted about a guide rod 62 can provide a biasing force to move the cam into the initial position. The spring 61 and rod 62 reside in an opening 55 adjacent surface 50 within the hub 42. A guide block 63 is secured to the inner surface of the cam 56 by screw 64. The block 63 is bored to receive slidably the rod 62 which serves to guide the cam in its lateral displacements between positions within the hub 42. The block 63 by its weight adds mass to the adjacent end of the cam. The rod 62 is secured at its ends within the end portions of opening 55 in the hub 42.

The cam 56 is provided with an escapement mechanism to rotate the spool 46 through a predetermined angular displacement in the hub 42. For this purpose, the spool on flange 54 is provided with a plurality of equally-spaced projections, such as cylindrical pins 66–72. These pins cofunction with the cam 56 to provide for a two stage angular advancement of spool relative to the hub 42 to feed cutting line from the head 19 during cam displacement. Preferably, an odd number of pins is employed so that the cam centrally locks to one pin at the initial position; and then, the cam slides between adjacent pins at the outward position. Good results have been obtained using seven pins at equal angular spacings on a spool so as to feed about one and one half inches during one line feeding cycle. Other escapement arrangements can be used for different controlled spool rotations, if desired.

The cam 56 is provided at one end 64 with a lug 76 to cooperate with the pins. The lugs 76 engages one of the pins (i.e., pin 66 in FIG. 5) to prevent spool rotation when the cam is in its initial position. The lug 76 terminates spool advancement when the cam 56 is moved from the outward position to the inward position by engaging the next arriving pin (i.e., pin 67 in FIG. 4). The spool in its line feeding cycle advances angularly between adjacent pins, or about 50°.

The spool advancement occurs in first and second stages, each stage of about 25° angular displacement.

The first stage advancement occurs when the cutting line is shortened and the head increases in rotational speed from a first magnitude (i.e., 5,000 rpm) to a second magnitude (i.e., 7,000 rpm) whereat the cam 56 moves from its initial position (FIG. 5) to its outward position (FIG. 4). The spool 56 is now able to rotate the first stage of angular advancement until a pin (i.e., pin 70) arrives substantially diametrically opposite the lug 76 and contacts a camming surface 77 on the other end 65 of the cam 56.

Preferably, the lug 76 is formed by a landing surface 78 which gradually engages an oncoming pin that is stopped gently upon a lateral surface 79 about mid width of the cam. Also, the lug 76 has a retreating surface 81 that insures the cam 56 clearing the lug 76 upon its movement towards the outward position with the spool moving angularly only a few degrees where the pin is slightly past the surface 79. The surface 81 insures positive release of the pin engaged by the lug 76 upon shifting of the cam into the outward position, even momentarily.

The particular rotational speed of the head 19 to produce lateral shifting of the cam 56 between initial and outward positions is determined by the mass of the cam relative to the axis of rotation and the bias provided by the spring 61. The spring 61 and the mass of the cam are adjusted to provide the desired functioning parameters. For example, a stock spring 61 and the mass of the cam are adjusted to provide the desired functioning parameters. A stock spring 61 can be complemented by boring one or more holes 73 and 74 within the cam 56 for adjustment of balance and mass. If desired, one or more turns also can be removed from the spring 61 for proper cam functioning.

As mentioned, the end 65 of the cam 56 carries a camming surface 77 which engages an oncoming pin (i.e., pin 70) when the spool 56 has rotated its first angular increment upon the lug 76 releasing pin 66 for movement. This camming surface 77 is an important feature of the cam 56. More particularly, the surface 77 is oriented tangentially to the angular travel of the pins so that the spool is rotated the second angular displacement to return the cam to its initial position. However, the spool now is rotated only in response to the drag of the cutting line 21 in cutting vegetation. Stated in another manner, the free air travel of the cutting line exerts insufficient centrifugal force upon the spool to rotate it past the camming surface 77 and thereby force the cam 56 into its initial position.

The camming surface 77 is preferably a straight line and the angle of its tangent to the arc travelled by the pins is sufficient that only cutting line drag in cutting vegetation is sufficient to rotate the spool and move the pin past the surface 77. This angle should be the minimum tangent that windage or free air travel of the cutting line cannot move a pin across the cam surface 77.

There should be a minimum lead distance before the oncoming pin touches the surface 77, preferably as the pin moves adjacent to the end 65 of the cam. At the same time, the spool 46 must have rotated angularly a distance sufficient for the lug 76 to have been cleared by the pin previously held against the surface 79. It will be apparent that the end 65 of the cam moves at least partially between adjacent pins on the spool when the cam has reached its outward position.

In some cases, the surface 77 may be curved or carry a projection 82 so that there is a snap action passage of the pin across the surface 77, or for other reasons.

As a result of the configuration of the surface 77, mere windage or free air travel of the extended cutting line 21, or reduction in rotation (i.e., 5,000 rpm) of the head 19, will not produce the second angular displacement of the spool within the hub. It is only the drag of the cutting line in cutting vegetation that completes the extension of cutting line from the head. Thus, the present feeder mechanism cannot suffer the "machine gun" line feeding situation. If the head slows down or stops when the cam is moved into the outward position, only the first angular displacement of the spool within the hub will occur. If no vegetation is being cut after the head is again rotated, no second angular displacement of the spool occurs. Only in cutting vegetation is the second stage of cutting line extension completed.

However, when the second stage of cutting line extension is completed, then the head is ready to repeat the cutting line extension cycle upon the rotary speed of the head increasing from the first magnitude to the second magnitude.

If desired, the last increment of cutting line feeding by the second half of spool angular displacement can be induced by the operator. In this regard, the cam is returned to the initial position at an rpm value much less than normally provided by the motor (i.e., 500 rpm). For this purpose, the spring 61 can be made sufficiently weak that the cam will return to its initial position when the operator of trimmer 11 releases the switch 16 and the head slows to the preselected reduced rpm. This start/stop operation can supplement the automatic cycling provided by the surface 77 acted upon by the angular movement of the pins.

Several cam embodiments are shown in FIGS. 6-8. In these FIGS. like elements will carry like numerals to simplify their description relative to FIGS. 1-5. However, any embodiment can be used in the head 19.

The camming surface 77 can be adjusted to conform to the torque produced by the motor 23 relative to the drag of the cutting line 21 during vegetation cutting. With reference to FIG. 6, the cam 56 is provided with a modified camming surface 87 that is at a greater tangential angle to pin travel than the surface 77. As a result, the pins can travel along the surface 87 only upon a much greater level of torque and responsive drag produced by cutting line engaged in cutting vegetation. If desired, a retreating surface 88 can be provided on the cam 56 so that the end 65 of the cam will pass between more closely spaced pins than the pins 66-72 shown in FIGS. 3-5. Also, the retreating surface 89 at the lug 76 is much longer and more angular so as to assist in clearing a pin soon after its release for angular movement.

The cam in FIG. 7 has been altered to operate in a trimmer 11 having similar characteristics but reduced motor torque by providing additional holes 91 to reduce its mass. As a result, a lower level of centrifugal force will move the cam from its initial position into its outward position.

Another cam is shown in FIG. 8. This cam 96 has at its end 104 a concave landing surface 108 to gently slow the spool and allow a pin to be stopped upon a small lateral surface 109 on lug 116. A similar retreating surface 111 assists in moving the pin past the lug 116. This arrangement of surfaces at the end 106 is especially useful on small trimmers 11 with a low torque motor 23. Also, these surfaces about the lug 116 reduce the speed spread in rpm between the first and second magnitudes to shift the cam from the initial position to the outward position. The other end 105 is arranged to have a camming surface 117 that is concave so that the cam is moved geometrically increasingly towards the initial position by a constant angular movement of the engaging pin. Once the pin crosses the nose 112, the concave retreating surface 118 allows the pin to slide clear of the cam. Thus, the inertia of the pin acts on the cam through surfaces 117 and 118 to insure a snap-action return of the cam from its outward position into its inward position.

Various other arrangements and configurations of the surfaces at the ends of the cam will be apparent for a particular application to a given trimmer.

Although the head 19 may be formed of metal, plastic or other material, it is preferred to use rather inexpensive polymeric materials (i.e., Nylon) which are readily fabricated by high-speed molding operations. The spool 46 can carry sufficient cutting line 21 (i.e., 0.065-0.100 inch in diameter Nylon ® monofilament polymer) for several years' vegetation cutting before requiring a new supply of cutting line. When desired, the glide ball 51 is unthreaded from stud 43. Then, the spool is removed from the head. Cutting line can be wound upon the spool 46. Alternatively, a spool carrying a fresh supply of cutting line is introduced into the spool 46. The ball 51 is threaded upon the stud 43 to reassemble the head.

From the foregoing description, it will be apparent that there has been provided a novel apparatus for cutting vegetation which provides a convenient and safe method of extending cutting line as desired by the operator. It will be understood that certain changes or alterations in the present apparatus may be made without departing from the spirit of this invention. These changes are contemplated by and are within the scope of the appended claims which define the invention. Additionally, the present description is intended to be taken as an illustration of this invention.

What is claimed is:

1. An apparatus for cutting vegetation, comprising:
   (a) a head rotatable about an axis of rotation;
   (b) a spool journaled for rotation within said head;
   (c) said head provided at its periphery with aperture means;
   (d) a supply of flexible non-metallic cutting line coiled upon said spool, and said cutting line having a free end extending from said aperture exteriorly of said head into a cutting plane;
   (e) means including an elongated planar cam for selectively controlling rotation of said spool within said head for feeding increments of said cutting line into the cutting plane during rotation of said head;

(f) said cam mounted within said head in a plane transverse to the rotational axis and adapted to move laterally diametrically between initial and outward positions by centrifugal forces when said head increases in rotational speed from a first magnitude to a second magnitude;

(g) said spool having a plurality of axially-projecting pins arranged in a circle about the axis of rotation;

(h) said cam having a lug at one end thereof, and said lug engaging a projection pin on said spool with said cam at its initial position to prevent rotation of said spool relative to said head;

(i) biasing means for urging said cam into the initial position at rotational speeds of said head less than the first magnitude;

(j) said cam having a camming surface at its end opposite to said lug, and said camming surface adapted to engage a pin on said spool with said cam in its outward position whereby drag of said cutting line during vegetation cutting but not in free air travel rotates said spool within said head and moves the pin across said camming surface to return said cam from its outward position to its initial position thereby securing said spool against rotation relative to said head until its speed again increases from the first magnitude to the second magnitude; and (k) said cam being responsive to increases in rotational speed to move from the initial position to the outward position and said cam being responsive to the urging of said spool to move from the outward position to the initial position whereby said spool rotates a predetermined angular displacement in said head for feeding increments of cutting line into the cutting plane.

2. The apparatus of claim 1 wherein said camming surface is a straight line.

3. The apparatus of claim 1 wherein said camming surface engages an oncoming pin substantially adjacent its end being approached by the pin.

4. The apparatus of claim 2 wherein the pin engages said camming surface only after said spool rotates angularly in said head a sufficient displacement that the pin released by said lug has moved out of engagement with said lug.

5. An apparatus for cutting vegetation, comprising:
(a) a head rotatable about an axis of rotation;
(b) a spool journaled for rotation within said head;
(c) said head provided at its periphery with aperture means;
(d) a supply of flexible non-metallic cutting line coiled upon said spool, and said cutting line having a free end extending from said aperture exteriorly of said head into a cutting plane;
(e) means including an elongated planar cam for selectively controlling rotation of said spool within said head for feeding increments of said cutting line into the cutting plane during rotation of said head;
(f) said cam comprising a relatively thin flat metal strip mounted within said head in a plane transverse to the rotational axis of said head and adapted to move laterally diametrically between initial and outward positions by centrifugal forces when said head increases in rotational speed from a first magnitude to a second magnitude, said strip including an elongated central opening adapted to provide for said cam to be slidably received over an axial post in said head, said strip being urged by a diametrically aligned spring into said initial position, and said strip having an adjusted mass relative to said spring whereby said first and second magnitudes of rotational speed of said head are in the normal operating ranges of rotational speeds during cutting of vegetation;

(g) said spool having a plurality of axially-projecting pins arranged in a circle about the axis of rotation;

(h) said cam having a lug at one end thereof, and said lug engaging a projection pin on said spool with said cam at its initial position to prevent rotation of said spool relative to said head;

(i) biasing means for urging said cam into the initial position at rotational speeds of said head less than the first magnitude;

(j) said cam having a camming surface at its end opposite to said lug, and said camming surface being adapted to engage a pin on said spool with said cam in its outward position whereby drag of said cutting line during vegetation cutting but not in free air travel rotates said spool within said head and moves the pin across said camming surface to return said cam from its outward position to its initial position thereby securing said spool against rotation relative to said head until its speed again increases from the first magnitude to the second magnitude; and (k) said cam being responsive to increases in rotational speed to shift from the initial position to the outward position and rotation of said spool returns said cam from the outward position to the initial position whereby said spool rotates a predetermined angular displacement in said head for feeding increments of cutting line into the cutting plane.

6. The apparatus of claim 5 wherein said lug is formed on said strip by a projection substantially at mid width of said strip.

7. The apparatus of claim 6 wherein said camming surface occupies only a portion of the width at the end of said strip and the remainder of the width of said strip is reduced so that said cam in shifting into the outward position will move said camming surface between adjacent pins on said spool diametrically opposite to said pin released by said lug in freeing said spool for rotation relative to said head.

8. The apparatus of claim 5 wherein said lug is formed on the end of said strip by an inclined surface merging into a radially projecting surface for engaging said pins carried on said spool.

9. An apparatus for cutting vegetation, comprising:
(a) A head rotatable about an axis of rotation;
(b) a spool journaled for rotation within said head;
(c) said head provided at its periphery with aperture means;
(d) a supply of flexible non-metallic cutting line coiled upon said spool, and said cutting line having a free end extending from said aperture exteriorly of said head into a cutting plane;
(e) means including an elongated planar cam for selectively controlling rotation of said spool within said head for feeding increments of said cutting line into the cutting plane during rotation of said head;
(f) said cam mounted within said head in a plane transverse to the rotational axis and adapted to move laterally diametrically from an initial position to an outward position by centrifugal forces when said head increases in rotational speed from a first magnitude to a second magnitude;

(g) biasing means for returning said cam into the initial position at rotational speeds of said head less than the first magnitude;

(h) said cam provided with locking means for securing said spool against rotation relative to said head with said cam in the initial position; and (i) said cam provided with cam surface means acted upon by means connected to said spool whereby the rotation of said spool due to the drag of said cutting line in cutting vegetation but not in free air travel rotates said spool within said head for returning said cam from its outward position to its initial position thereby securing said spool against rotation relative to said head until its speed again increases from the first magnitude to the second magnitude, whereby said spool rotates a predetermined angular displacement in said head for feeding increments of cutting line into the cutting plane.

10. The apparatus of claim 9 wherein said spool has a plurality of axially-projecting pins arranged equally spaced in a circle about the axis of rotation.

11. The apparatus of claim 10 wherein said cam has a projecting lug as said locking means and said lug engaging a projecting pin on said spool with said cam at its initial position to prevent rotation of said spool relative to said head.

12. The apparatus of claim 11 wherein said cam has a tangential camming surface as said camming surface means at its end opposite to said lug, and said camming surface adapted to engage a pin after said spool has rotated a first angular displacement relative to said head upon said cam shifting from the initial position to the outward position.

13. The apparatus of claim 12 wherein said camming surface is adapted to allow said pin to move thereacross and return said cam from its outward position to its initial position only when said spool is rotated by the drag of said cutting line during vegetation cutting and not in free air travel whereby said spool rotates a second angular displacement relative to said head upon the cam shifting from the outward position to the initial position.

14. The apparatus of claim 13 wherein said camming surface is a straight line.

15. An apparatus for cutting vegetation comprising:

(a) a head rotatable about an axis of rotation, said head including an aperture formed on its periphery;

(b) a spool journalled for rotation on and with respect to said head;

(c) a supply of flexible cutting line coiled on said spool and having a free end portion extending from said aperture exteriorly of said head into a cutting plane;

(d) means comprising a cam disposed on said head and movable between an initial position and an outward position, said cam being cooperable in said initial position with means on said spool for restraining said spool against rotation with respect to said head to feed said line through said aperture when said head is rotating at or below a speed of a first magnitude, said cam being operable to move to said outward position to permit a predetermined amount of rotation of said spool with respect to said head to feed cutting line into said cutting plane upon the speed of said head increasing to a second magnitude, and (e) means on said spool engageable with said cam for moving said cam toward said initial position under the urging of said spool to rotate with respect to said head, whereby upon movement of said cam from said initial position to said outward position and return to said initial position said spool rotates a predetermined angular displacement with respect to said head to feed predetermined increments of cutting line into said cutting plane.

16. The apparatus set forth in claim 15 wherein:
said means on said spool comprise a plurality of projections, respective ones of which are engageable with a first portion of said cam to prevent rotation of said spool with respect to said head in said initial position of said cam, and respective ones of said projections are engageable with a second portion of said cam when said cam is in said outward position for urging said cam to return to said initial position.

17. The apparatus set forth in claim 16 wherein:
said cam comprises a member disposed on said head and having a mass distribution with respect to the axis of rotation of said head such that said cam moves from said initial position to said outward position in response to an unbalanced centrifugal force acting on said cam.

18. The apparatus set forth in claim 17 wherein:
said cam includes a lug formed on said member and engageable with one of said projections on said spool to prevent rotation of said spool with respect to said head in said initial position of said cam.

19. The apparatus set forth in claim 18 wherein:
said cam includes a surface portion adjacent said lug and engageable with one of said projections approaching said lug to provide gradual engagement of said lug by said one projection.

20. The apparatus set forth in claim 18 wherein:
said cam includes a surface portion adjacent said lug shaped to provide positive release of said spool for rotation of said spool with respect to said head upon movement of said cam from said initial position to at least momentarily disengage said lug from said projection.

21. The apparatus set forth in claim 17 wherein:
said cam includes a cam surface engageable by one of said projections and shaped such that under the urging of said spool to rotate with respect to said head said one projection operates to move said cam toward said initial position.

22. The apparatus set forth in claim 21 wherein:
said cam surface intersects the line of travel of said projections on said spool at an angle such that said projection urges said cam toward said initial position under a predetermined force caused by said portion of said cutting line extended into said cutting plane and urging said spool to rotate with respect to said head.

23. The apparatus set forth in claim 21 wherein:
said cam surface includes a projecting portion cooperable with a projection on said spool to provide a snap action of urging said cam toward said initial position.

24. The apparatus set forth in claim 15 or 22 together with:
spring means engageable with said cam for yieldably biasing said cam toward said initial position.

25. The apparatus set forth in claim 16 wherein said projections on said spool comprise a plurality of axially-projecting pins arranged equally spaced in a circle about the axis of rotation of said spool.

26. The apparatus set forth in claim 22 wherein said cam surface is adapted to allow said projection to move thereacross and return said cam from its outward position to its initial position only when said spool is rotated by the drag of said cutting line during vegetation cutting and not in free air travel whereby said spool rotates a further angular displacement relative to said head upon said cam moving from said outward position to said initial position.

* * * * *